Oct. 18, 1938.  M. LASKIN  2,133,922
SCRAPER ATTACHMENT FOR BLOWTORCHES
Filed Sept. 22, 1937
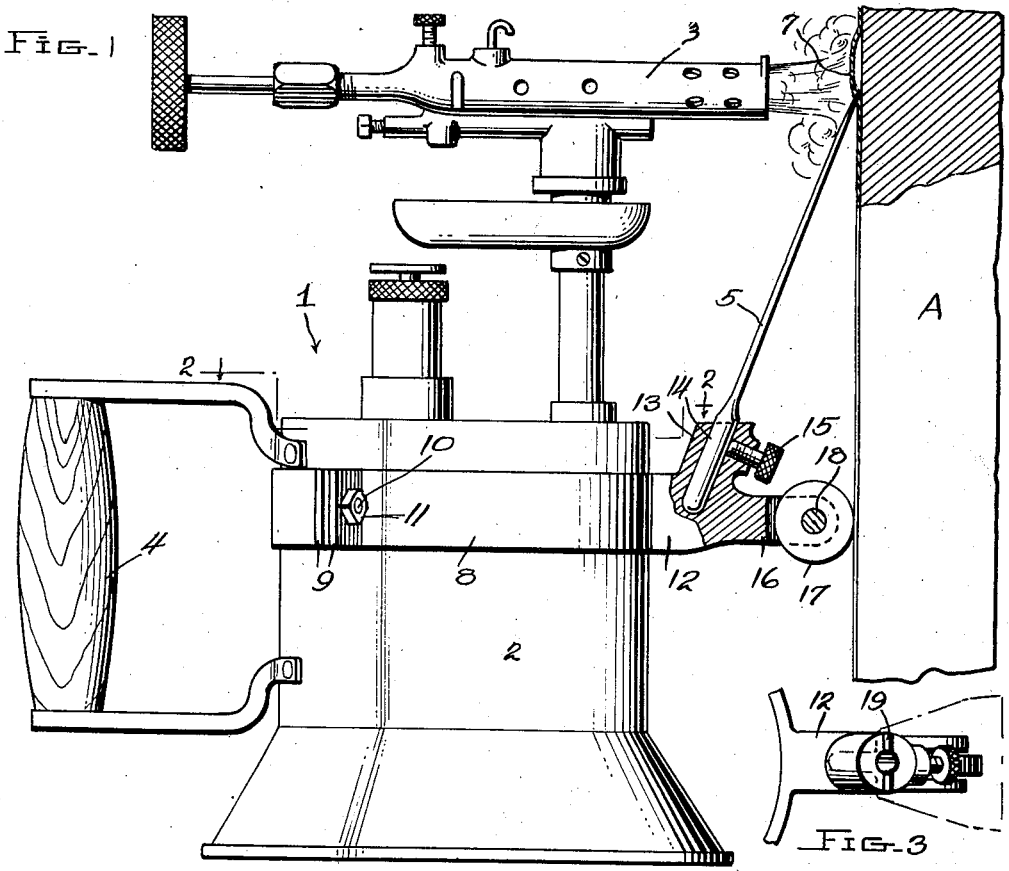
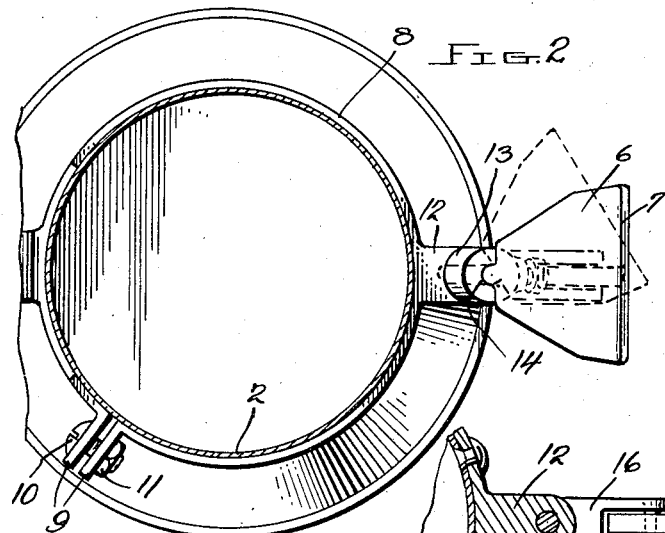
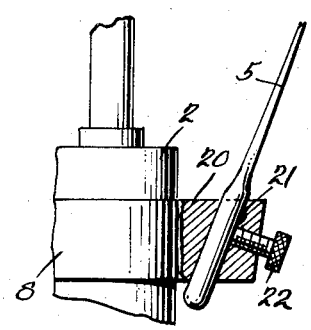
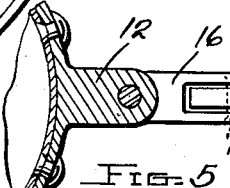
Inventor
Meyer Laskin
Robert L. Dennison
Attorney Patented Oct. 18, 1938

2,133,922

UNITED STATES PATENT OFFICE 2,133,922

SCRAPER ATTACHMENT FOR BLOWTORCHES

Meyer Laskin, Baltimore, Md.

Application September 22, 1937, Serial No. 165,173

4 Claims. (Cl. 158—33)

The present invention relates to improvements in paint removers, and more particularly to that class of paint removers wherein a blow torch is employed to heat and loosen the paint and a scraper follows for scraping the same.

At the present time, a painter holds a blow torch in one hand and a scraper in the other hand. This is very disadvantageous, in that considerable time and labor is expended in removing the paint from a painted surface and furthermore, such operation is inefficient and frequently results in portions of the painted surface being burnt.

The principal object of the present invention resides in combining the torch and scraper into one implement so that it may be held in one hand of the operator and moved quickly and efficiently across the painted surface, the scraper being mounted in such position with respect to the burner of the blow torch, that the flame of the burner will impinge against the painted surface and also upon the edge portion of the scraper.

Another important object of the invention is to provide means for adjustably securing the scraper at the proper angle with respect to the flame from the burner and the surface being scraped.

A still further and important object resides in the provision of a guide roller in association with the scraper and for contact with the painted surface to facilitate the uniform scraping of the paint and rendering the operation of the device much easier.

A further object is to provide an attachment of the above mentioned character that may be readily and easily secured on a blow torch without necessitating any alterations of the latter, the parts being quickly assembled and disassembled as well as adjusted.

Other objects and advantages will become apparent from the following description.

In the accompanying drawing forming a part of this invention and in which like numerals designate corresponding parts throughout the several views:

Figure 1 is a side elevation of a blow torch showing my improved scraper attachment mounted thereon, parts being shown in section.

Figure 2 is a sectional view taken approximately on the line 2—2 of Figure 1, looking downwardly.

Figure 3 is a plan view of the socket member.

Figure 4 is a fragmentary detail of a modification of the socket member, and

Figure 5 is a fragmentary detail showing the socket member riveted to the torch body encircling band.

In the drawing, wherein for the purpose of illustration, is shown the preferred embodiment of my invention, the numeral 1 designates a blow torch of the conventional construction, the body thereof being designated at 2, the burner at 3 and the handle at 4.

The scraper employed in conjunction with the present invention includes a shank 5 and a fan-shaped blade 6, the scraping edge of which is denoted by the numeral 7.

The attachment consists of a split metal band 8 adapted to encircle the body 2 of the blow torch. The free ends of the band terminate in laterally disposed operated ears 9, through which a bolt 10 extends and a nut 11 is associated with the bolt to detachably secure the band 8 on the body 2.

An enlarged portion or socket member 12 is associated with the front portion of the band 8 and an upwardly and angularly disposed boss 13 projects from the enlarged portion 12 and is formed with an axial bore 14 for removably receiving the shank 5 of the scraper. A set screw 15 provides a means for securing the scraper in any adjusted position. Preferably, the scraper is mounted in the socket member so that its scraping edge portion will be disposed in the path of the flame from the burner 3, with the major portion of the flame impinging against the painted surface as is clearly illustrated in Figure 1.

A yoke 16 projects outwardly from the front of the enlarged portion 12, below the boss 13 and a roller 17 is mounted to freely rotate between the arms of this yoke on the transverse pin 18. The purpose of the roller 17 is to guide the scraper along the painted surface and enables the paint to be scraped in a uniform manner.

With the parts arranged as shown in Figure 1, the flame from the burner 3 will impinge against the painted surface A in advance of the scraper and at the same time, the scraping edge portion of the scraper blade will be heated by the lower portion of the flame. The guide roller 17 will bear against the painted surface and as the operator holding the handle 4 moves the torch upwardly, the heated paint on the surface A will be readily and easily, as well as uniformly scraped off.

When working on angular painted surfaces, such as the slats of shutters, the scraper may be adjusted to the position shown in the dotted lines in Figure 2. The shank of the scraper is capable of being rotatably adjusted also in the socket member 13.

If it is desired to secure the scraper against turning movement, the boss 13 may be slotted as shown at 19 in Figure 3 and the lower portion of the blade 6 will be received in the slot 19, without interfering with the vertical adjustment of the scraper.

In Figure 4, there is shown a modification of the socket member, wherein the socket member 20 is formed with a through bore 21 to receive the shank of the scraper and a set screw 22 is arranged in the front side of the socket member for holding the scraper in its properly adjusted position.

Figure 5 discloses the socket member as being riveted to the band that encircles the blow torch body.

It will thus be seen from the foregoing description that I have provided a scraper attachment for blow torches that is inexpensive, strong and durable, and at all times positive and efficient in carrying out the purposes for which it has been designed and due to its simplicity can be readily and easily assembled and adjusted on a blow torch.

While I have shown the preferred embodiment of my invention, it is to be understood that various changes in the size, shape and arrangement of parts may be resorted to without departing from the spirit of the invention and the scope of the appended claims.

Having thus described the invention, what I claim is:

1. In a paint remover attachment for blow torches, a band detachably secured on the body of the torch, a socket member on the front portion of the band, a scraper having its shank fitted in the socket member and its blade portion disposed in juxtaposition to the burner of the blow torch, said scraper being capable of adjustment vertically, and work engaging means for guiding the movement of the torch and the scraper over the painted surface.

2. In a paint remover attachment for blow torches, a band detachably secured on the body of the torch, a socket member on the front portion of the band, said socket member being formed with an angular bore, a scraper having its shank receivable in the bore with the blade disposed partially in the path of the flame from the burner of the torch, a set screw extending substantially radially of the bore in said socket member for securing the scraper in any vertically adjusted position, a yoke projecting forwardly from the band, and a work engaging roller mounted in the yoke for guiding the blow torch and the scraper.

3. In a paint remover attachment for blow torches, a socket member, means for securing the socket member on the body of a blow torch, a scraper having its shank fitted in the socket member and its blade portion disposed in juxtaposition to the burner of the blow torch, said scraper being capable of vertical adjustment, and work engaging means for guiding the movement of the torch and the scraper over the painted surface.

4. In a paint remover attachment for blow torches, a socket member, means for securing the socket member on the body of a blow torch, a scraper having its shank fitted in the socket member with the blade thereof disposed partially in the path of the flame from the burner of the torch, means for securing the scraper in any vertically adjusted position in the socket member, a yoke projecting forwardly from the socket member, and a work engaging roller mounted in the yoke for guiding the blow torch and the scraper over the painted surface.

MEYER LASKIN.